United States Patent [19]

Nielinger et al.

[11] 4,383,083

[45] May 10, 1983

[54] POLYAMIDE MOULDING COMPOSITION

[75] Inventors: Werner Nielinger; Bert Brassat; Rüdolf Binsack; Dieter Neuray, all of Krefeld, Fed. Rep. of Germany

[73] Assignee: Bayer Aktiengesellschaft, Leverkusen, Fed. Rep. of Germany

[21] Appl. No.: 199,472

[22] Filed: Oct. 22, 1980

[30] Foreign Application Priority Data

Oct. 27, 1979 [DE] Fed. Rep. of Germany ....... 2943515

[51] Int. Cl.$^3$ ...................... C08L 77/10; C08L 77/00
[52] U.S. Cl. .................................... 525/183; 525/184
[58] Field of Search ................................ 525/184, 183

[56] References Cited

U.S. PATENT DOCUMENTS

| 2,683,697 | 7/1954 | Newell | 525/184 |
| 2,795,524 | 6/1957 | Rodman | 525/184 |
| 3,134,746 | 5/1964 | Grabowski | 525/184 |
| 3,218,371 | 11/1965 | Grabowski | 260/857 |
| 3,431,227 | 3/1969 | Kastning | 525/184 |
| 3,468,974 | 9/1969 | Elgin | 525/184 |
| 3,491,034 | 1/1970 | Seelig | 525/184 |
| 4,174,358 | 11/1979 | Epstein | 525/184 |
| 4,197,379 | 4/1980 | Coran et al. | 260/845 |

FOREIGN PATENT DOCUMENTS

| 744119 | 11/1943 | Fed. Rep. of Germany . |
| 1301504 | 8/1969 | Fed. Rep. of Germany . |
| 2632957 | 1/1978 | Fed. Rep. of Germany . |
| 2730749 | 9/1978 | Fed. Rep. of Germany . |
| 1444425 | 5/1966 | France . |
| 2343018 | 3/1977 | France . |
| 1559041 | 1/1980 | United Kingdom . |

OTHER PUBLICATIONS

S.N. 400,571, Allen Custodian Property, 9/20/43, Emich.

Primary Examiner—Paul Lieberman
Attorney, Agent, or Firm—Connolly and Hutz

[57] ABSTRACT

Impact improved thermoplastic mixtures of at least partly aromatic polyamides and copolymers of alkadiene with 4–6 C-atoms and acrylonitrile.

5 Claims, No Drawings

POLYAMIDE MOULDING COMPOSITION

This invention relates to thermoplastic mixtures of at least partly aromatic and, preferably, amorphous polyamides and copolymers of an alkadiene containing from 4 to 6 carbon atoms and acrylonitrile, so-called nitrile rubbers.

Polyamides have a number of outstanding properties, such as rigidity and hardness, which make them particularly suitable for the production of mouldings in the technical field.

Numerous proposals have already been made, in order also to obtain optimal toughness in polyamides, such proposals including, for example, mixing them with other polymers.

For example DE-PS No. 744,119 describes the use of polybutadiene and polyisoprene for modifying polyamides. However, attempts to work polybutadiene into aliphatic polyamides in standard extruders having usual mixing times of from 10 to 60 s resulted in the formation of fragile, flaking products which are of no commercial use.

According to German Auslegeschrift No. 1,301,504, from 95 to 40% by weight of butadiene copolymers are mixed with from 5 to 60% by weight of polyamides based on caprolactam, lauric lactam, aminoundecanoic acid or adipic acid and hexamethylene diamine. In this way, the strength and elasticity of the rubber are increased, particularly after the addition of metal salts.

German Offenlegungsschrift No. 2,632,957 describes mixtures of aliphatic polyamides and diene copolymers. The diene copolymers are used for plasticising 6- and 6,6-polyamides.

Despite the outstanding notched impact strength of these polyamide mixtures, the flexural strength of the products is inadequate for certain applications.

It has now surprisingly been found that the toughness of at least partly aromatic and, preferably, amorphous polyamides can be significantly improved by the addition of copolymers of alkadienes and acrylonitrile without other mechanical properties of the polyamides, such as dimensional stability under heat and flexural strength, being significantly affected.

Accordingly, the present invention provides mixtures of thermoplastic polyamides and copolymers of $C_4$ to $C_6$-alkadienes and acrylonitrile which are characterised in that the mixtures consist of 1. from 65 to 95% by weight and preferably from 70 to 90% by weight of at least one partly aromatic and, preferably, amorphous polyamide, and 2. from 35 to 5% by weight and preferably from 30 to 10% by weight of a copolymer of $C_4$ to $C_6$-alkadienes and acrylonitrile and optionally the usual additives.

The at least partly aromatic and, preferably, amorphous polyamides preferably used in accordance with this invention are the following products which are described in German Offenlegungsschrifts Nos. 1,770,336; 1,645,537; 2,156,723; 2,635,085; 2,647,311 and 2,732,928 and in U.S. Pat. No. 3,150,117. They are obtained by the polycondensation of diamines, such as ethylene diamine, hexamethylene diamine, decamethylene diamine, dodecamethylene diamine, 2,2,4- and 2,4,4-trimethyl hexamethylene diamine, m- or p-xylylene diamine, bis-(4-aminocyclohexyl)-methane, bis-(4-aminocyclohexyl)-propane, 3,3'-dimethyl-4,4'-diaminodicyclohexyl methane, 3-aminomethyl-3,5,5-trimethyl cyclohexyl amine, 2,5- and/or 2,6-bis-(aminomethyl)-norbornane or 1,4-diaminomethyl cyclohexane, with dicarboxylic acids, such as isophthalic acid or terephthalic acid. It is, of course, also possible to use partly aromatic amorphous polyamides of the type obtained by polycondensing several monomers, and also partly aromatic amorphous polyamides of the type produced with the addition of aminocarboxylic acids, such as ε-aminocaproic acid, ω-aminoundecanoic acid, ω-aminolauric acid or their lactams, and/or dicarboxylic acids, such as oxalic acid, adipic acid, azelaic acid, decane dicarboxylic acid, heptadecane dicarboxylic acid, 2,2,4- and/or 2,4,4-trimethyl adipic acid.

Particularly suitable at least partly aromatic, amorphous polyamides are those obtained from isophthalic acid and hexamethylene diamine or from isophthalic acid, hexamethylene diamine and other diamines, such as 4,4'-diaminodicyclohexyl methane, isophorone diamine, 2,2,4- and/or 2,4,4-trimethyl hexamethylene diamine, 2,5- and/or 2,6-bis-(aminomethyl)-norbornane; or from isophthalic acid, 4,4'-diaminodicyclohexyl methane and ε-caprolactam; or from isophthalic acid, 3,3'-dimethyl-4,4'-diaminodicyclohexyl methane and 65% by weight of lauric lactam; or from terephthalic acid and the isomer mixture of 2,2,4- and/or 2,4,4-trimethyl hexamethylene diamine.

Instead of using pure 4,4'-diaminodicyclohexyl methane, it is also possible to use mixtures of the positionally isomeric diaminodicyclohexyl methanes consisting of from 70 to 99 mole percent of the 4,4'-diamino isomer, from 1 to 30 mole percent of the 2,4'-diamino isomer, from 0 to 2 mole percent of the 2,2'-diamino isomer and optionally more highly condensed diamines of the type obtained by hydrogenating diaminodiphenyl methane of commercial quality. Up to 30% of the isophthalic acid may be replaced by terephthalic acid.

The preferably nonvulkanised nitrile rubbers consist of (a) from 99 to 60% by weight and preferably from 92 to 70% by weight of alkadienes containing from 4 to 6 carbon atoms and (b) from 40 to 1% by weight and preferably from 8 to 30% by weight of acrylonitrile, the sum of (a) and (b) amounting to 100% by weight.

The nitrile rubbers used are preferably nonvulcanised copolymers of butadiene and/or isoprene and/or 1,4-pentadiene and acrylonitrile.

The nitrile rubbers may be used in the form of solid rubber, in the form of crumbs or in powder form. The molecular weight should be in the range of from 2000 to 500,000 and preferably in the range of from 20,000 to 250,000. The nitrile rubbers are preferably used in powder form.

The nitrile rubbers are advantageously worked into the polyamides in standard screw extruders, preferably at temperatures in the range from 230° C. to 300° C. Both single-screw and also twin-screw extruders are suitable. The mixtures may also be prepared on mixing rolls or in internal mixers of the type known in the rubber processing industry. In this case, however, it is important to work in the absence of air. In one preferred mixing process, designed in particular to shorten the mixing time, the mixtures may be prepared under the action of shear fields with shear gradients of >150 sec.$^{-1}$ in standard screw extruders, preferably in twin screw extruders. The mixtures are not vulcanised.

The polyamide moulding compositions according to the invention may contain the usual additives, such as lubricants and mould-release agents, fillers, reinforcing agents, dyes and pigments as well as stabilisers and flameproofing agents. Suitable additives such as these are inter alia glass and asbestos fibres, glass beads, talcum, wollastonite, mikrovit, chalk, quartz, titanium dioxide, zinc sulphide, cadmium sulphide and carbon black.

The additives are introduced either in pure form or as concentrates during the compounding of the moulding compositions. However, they may also be contained in one or more of the starting components.

Since the products are distinguished not only by their toughness, but also by their high rigidity and high tracking resistance, they are preferably used for the production of components in machine constructions, technical equipment, in car making and in the electrical field.

EXAMPLES 1 to 7

A polyamide of isophthalic acid and hexamethylene diamine is mixed with a nitrile rubber in a twin-screw extruder of the ZSK 53 type manufactured by Werner & Pfleiderer. The temperature of the melt in the screw is approximately 272° C., the throughput is 18 kg/h and the rotational speed 60 r.p.m.

The polyamide has a relative viscosity of 2.8, as measured on a 1% solution in m-cresol at 25° C.

The nitrile rubber is a copolymer of 61% by weight butadiene and 39% by weight acrylonitrile. (Perbunan N 3810(R))

Table 1 shows the properties of the mixtures in dependence upon their composition. The values for unmodified polyamide are quoted for purposes of comparison in the first column.

lonitrile. This mixture has a notched impact strength of 55 KJ/m$^2$ and a flexural stress at a given deflection of 94 MPa.

We claim:
1. Thermoplastic moulding mixtures consisting of
   (1) from 95 to 65% by weight of an amorphous polyamide;
   (2) from 5 to 35% by weight of a copolymer of
      (a) from 99 to 60% by weight of alkadiene containing from 4 to 6 carbon atoms; and
      (b) from 40 to 1% by weight of acrylonitrile
   (3) and optionally usual additives, the sum of (1) to (3) and the sum of (a) and (b) respectively amounting always to 100% by weight.
2. Mixtures as claimed in claim 1, containing of from 70 to 90% by weight of the polymer component (1) and from 10 to 30% by weight of the polymer component (2).
3. Mixtures as claimed in claim 1, wherein the copolymer consists of 92 to 70% by weight of component (a) and of 8 to 30% by weight of component (b).
4. Mixtures as claimed in claim 1, wherein the polyamide is the condensation product of isophthalic acid and hexamethylene diamine or of isophthalic acid, hexamethylene diamine and 4,4'-diaminodicyclohexyl methane, isophorone diamine, 2,2,4- and/or 2,4,4-trimethyl hexamethylene diamine, 2,5- and/or 2,6-bis-(aminomethyl)-nor-bornane; or of isophthalic acid, 4,4'-diamino dicyclohexyl methane and ε-caprolactam; or of isophthalic acid, 3,3'-dimethyl-4,4'-diaminocyclohexyl methane and 65% by weight of lauric lactam; or of terephthalic acid and the isomer mixture of 2,2,4- and/or 2,4,4-trimethyl hexamethylene diamine.

TABLE 1

Mixtures of the polyamide of isophthalic acid and hexamethylene diamine with Perbunan N 3810 ®

|  |  | Example No. |  |  |  |  |  |  |
|---|---|---|---|---|---|---|---|---|
|  |  |  | 1 | 2 | 3 | 4 | 5 | 6 | 7 |
| Composition | | | | | | | | | |
| Polyamide | % by weight | 100 | 95 | 90 | 85 | 80 | 75 | 70 | 65 |
| Nitrile rubber | % by weight | 0 | 5 | 10 | 15 | 20 | 25 | 30 | 35 |
| Properties | | | | | | | | | |
| Notched impact strength (DIN 53 453) | kJ/m$^2$ | 2.5 | 13 | 18 | 21 | 23 | 22 | 19 | 25 |
| Flexural stress at a given deflection (DIN 53 452) | MPa bb | 156 | 118 | 114 | 102 | 94 | 95 | 67 | 52 |
| Dimensional stability under heat according to Vicat Method B (DIN 53 460) | °C. | 124 | 122 | 123 | 122 | 121 | 122 | 115 | 112 |

EXAMPLE 8

A polyamide of isophthalic acid and hexamethylene diamine ($\eta_{rel}$2.8) is mixed as described in Examples 1 to 7 with a nitrile rubber of approximately 61% by weight of butadiene and approximately 39% by weight of acry- 5. Mixtures as claimed in claim 1, wherein the copolymer (2) is a nonvulcanized copolymer of butadiene and/or isoprene and/or 1,4-pentadiene and acrylonitrile.

* * * * *